United States Patent [19]
Jeffers et al.

[11] 3,882,414
[45] May 6, 1975

[54] HALIDE DISSOCIATIVE TRANSFER LASER

[75] Inventors: William Q. Jeffers, Florissant; Charles E. Wiswall, Hazelwood, both of Mo.

[73] Assignee: McDonnell Douglas Corporation, St. Louis, Mo.

[22] Filed: Oct. 5, 1972

[21] Appl. No.: 295,195

[52] U.S. Cl. .................... 331/94.5 G; 331/94.5 P
[51] Int. Cl. .............................................. H01s 3/22
[58] Field of Search ..................... 331/94.5; 330/4.3

[56] References Cited
UNITED STATES PATENTS
3,676,797  7/1972  Kovacs .............................. 331/94.5
3,706,942  12/1972  Ultee ................................ 331/94.5

OTHER PUBLICATIONS
Jeffers et al., Laser Action in Atomic Fluorine Based on Collisional Dissociation of HF*. Appl. Phys. Letters, Vol. 17, No. 10 (Nov. 15, 1970) pp. 444–446.

Wood et al., Transverse-Discharge Hydrogen Halide Lasers. Appl. Phys. Lett., Vol. 20, No. 2 (Jan. 15, 1972) pp. 77–79.

Primary Examiner—William L. Sikes
Attorney, Agent, or Firm—Charles B. Haverstock

[57]  ABSTRACT

A gas laser in which stimulated emission in the visible region of the spectrum is achieved using an atomic halide such as atomic fluorine as the lasing specie, said laser having relatively very high gain on the laser transitions, being capable of operating as a sealed off system, and being capable of producing emission in the visible region of the spectrum.

1 Claim, 2 Drawing Figures

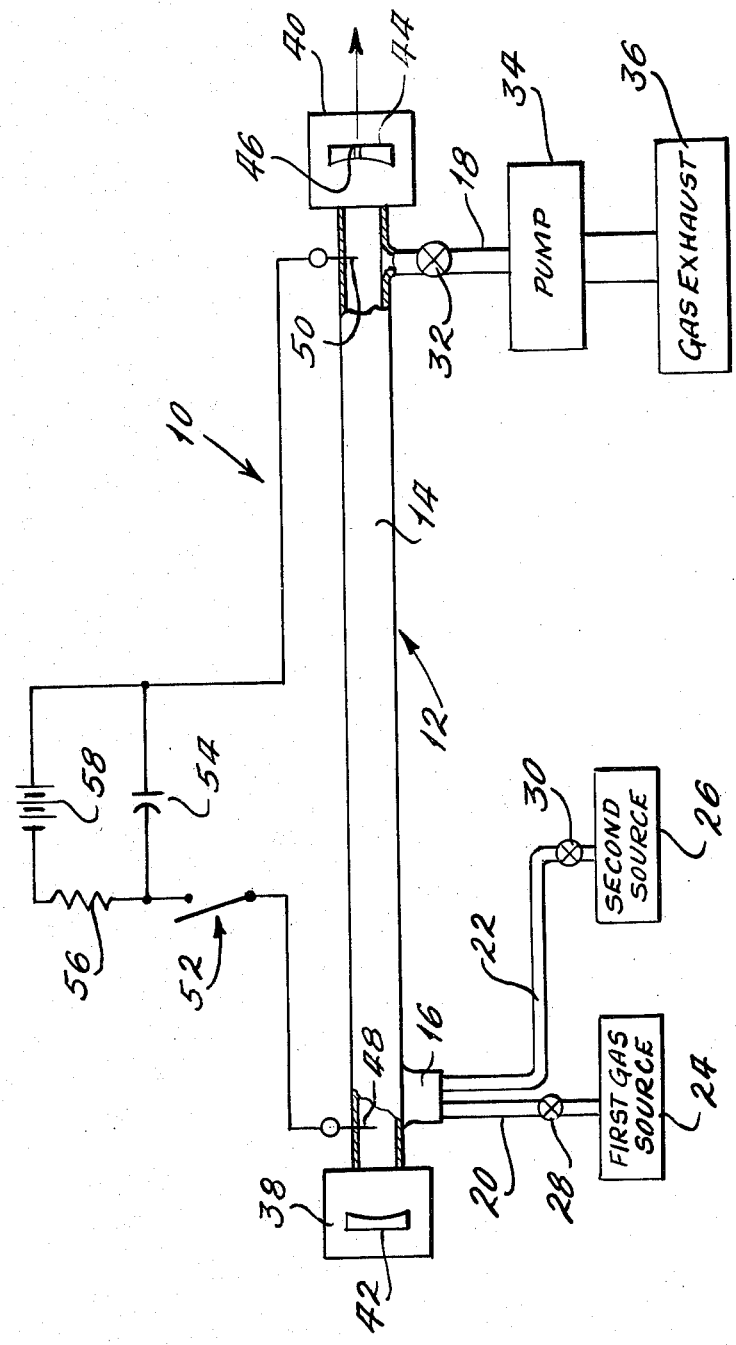
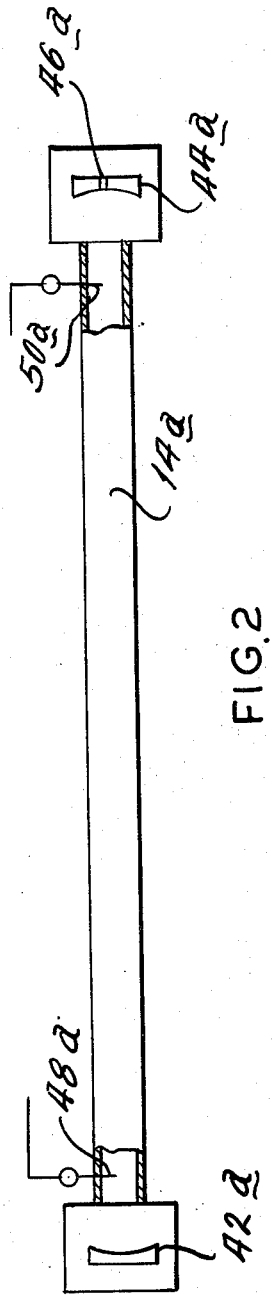

HALIDE DISSOCIATIVE TRANSFER LASER

Many laser devices are known and in existence including many gas laser devices. For the most part, the known devices including the known gas laser devices, have relatively low gain characteristics, are relatively inefficient, low power devices, and the known gas lasers are relatively unstable, and therefore difficult to operate and control. The present construction overcomes these and other shortcomings and disadvantages of the prior art constructions by teaching the construction and operation of a gas laser which can operate in the visible region of the spectrum and uses an atomic halide such as atomic fluorine as the lasing specie. The subject gas laser includes a discharge chamber wherein gaseous reactants including, for example, a gaseous mixture of helium or some other preferably inert gas and a hydrogen halide such as hydrogen fluoride are subjected to an electric discharge and an associated dissociation of some of the halide. This dissociation must be accompanied by excitation of some of the dissociated halide whereby a chemical reaction is produced accompanied by a population inversion of the energy levels and production of a lasing condition. The subject laser device may include a usual type of optical resonator means suitably constructed and located to respond to the illumination produced by the lasing condition so as to be able to produce the desired laser output. The subject device can be made to operate in a pulsed condition. It can also be operated by continuously flowing the gaseous mixture of the reactants through the discharge portion of the device, and it can be operated by having the discharge chamber filled with a static fill of the desired gaseous mixture. All of the various forms of the subject device use dissociated atomic fluorine or some other dissociated halide as the active gaseous medium, and in all embodiments the atomic halide is produced by dissociative collisions between particles of helium or some other metastable preferably inert substance, and the gaseous halide.

Certain aspects of the theory, structural requirements and chemistry of the subject gaseous laser are described in a publication by the inventors of the subject case entitled "Laser Action In Atomic Fluorine Based On Collision Dissociation of HF," in Volume 17, Number 10 of the Nov. 15, 1970 issue of Applied Physics Letters. This article details certain preliminary experimental work and investigation undertaken which led to the present invention and to an investigation of other gaseous mixtures which appear to offer particular promise. Certain of the structural and operational aspects of an actual working construction, and certain of the gaseous mixtures employed, however, have never been disclosed. This is also true of certain modifications and variations thereof, including certain features of the flow, use of resonator means having a transparent as well as a semi-transparent outlet aperture at the desired wavelengths, certain of the structural details of the device and its assemblage for best operation, and importantly, the specific use of the various hydrogen halides including hydrogen fluoride mixed with helium and/or some other gas and in some cases with added hydrogen. These are to be distinguished from other known devices and the gaseous substances used including for example those disclosed in Kovacs et al U.S. Pat. No. 3,676,797. Furthermore, the present improved construction is able to produce much higher gains and more easily detectable lasing conditions and at more wavelengths than any known gas laser including the laser disclosed in the Kovacs et al patent.

It is therefore a principal object of the present invention to provide an improved gas laser capable of producing by dissociation and excitation atomic halide particles which are able to produce detectable visible lasing.

Another object is to provide a relatively simple gas laser construction which operates at very high gain on its laser transitions.

Another object is to construct a gas laser that produces excited dissociated atomic fluorine particles as its lasing specie.

Another object is to teach the construction and operation of a gas laser that uses in its preferred form a gaseous mixture that includes helium and hydrogen fluoride.

Another object is to teach the construction and operation of a novel gas laser capable of operating in a sealed off system.

Another object is to provide a gas laser capable of being operated as a continuous gas flow through device and as a device wherein the mixture of gaseous substances are maintained in a static condition.

Another object is to provide a gas laser that can be constructed as a portable device.

These and other objects and advantages of the present gas laser will become apparent after considering the following detailed specification which discloses and describes several preferred embodiments thereof in conjunction with the accompanying drawing wherein.

FIG. 1 is a schematic plan view, partly in section, of a gas laser device constructed according to one embodiment of the present invention; and, FIG. 2 shows a modified embodiment of the subject gas laser especially designed for use with a static gaseous medium, which embodiment can be constructed for portable use.

Referring to the drawing more particularly by reference numbers, number 10 indicates a gas laser system including a gas laser element 12 constructed according to the present invention. The laser element 12 includes an elongated gas discharge tube 14 having gas inlet means 16 located near one end, and a gas outlet 18 located near the opposite end. The inlet 16 has connections to inlet conduits 20 and 22 which are connected respectively to a first gas source 24 which is shown as a source of helium or other suitable gas and to a second gas source 26 shown as a source of hydrogen fluoride or other suitable gas. During operation these gases flow through the discharge tube 14, and the flow of these gases through the conduits 20 and 22 into the discharge tube 14 is controlled by means such as valve or flow regulator means 28 and 30, respectively. The means 28 and 30 also control the amounts, including the relative amounts, and the pressures of the respective gases, and hence of the gaseous mixture present in the discharge tube 14. A pressure for the gaseous mixture between about 0.01 and 2.0 Torr. provides the most desirable pressure operating range. The outlet 18 is in like manner controlled by other similar valve or metering means 32, and is connected to pumping means 34 which are in turn connected to gas exhaust means 36.

The discharge tube 14 is an elongated hollow tube which may be constructed of glass or of some other preferably inert transparent or translucent material, and extends between spaced light reflective assemblies 38 and 40, each of which is shown as including a concave mirror member 42 and 44, respectively. The assemblies 38 and 40 and their associated mirrors 42 and 44 in combination form optical resonator means, and are positioned at locations in or adjacent to the discharge tube 14 so that they are able to reflect the light produced when a lasing condition is established in the usual way. The optical resonator means may be of a conventional construction such as are commonly used in gas lasers, and one of the mirrors, namely, the mirror 44 is provided with an outlet aperture 46 through which the laser output emission passes.

The discharge tube 14 has a cathode element 48 positioned to extend through the wall of the tube 14 adjacent to one end thereof, shown in FIG. 1 as the end associated with the inlet gas sources 24 and 26. Another element which is the anode 50 is positioned extending into the tube 14 adjacent to the opposite end thereof near to where the outlet conduit 18 is connected. The anode 50 and the cathode 48 are connected into an electric discharge circuit which is shown in simplified form as including a switch 52, a capacitor 54, a resistor 56 and a D.C. voltage source 58. When the switch 52 is open the capacitor 54 is charged through a closed circuit which includes the capacitor 54, the resistor 56 and the power source 58. Thereafter, when the switch is closed the capacitor will discharge through a circuit which includes the switch 52, the cathode 48, the gas mixture present in the discharge tube 14, and the anode 50. The discharge of the capacitor 54 through the gaseous medium causes the production of some atomic halide due to dissociative collisions that take place between the metastable atoms of the selected inert gas that usually includes some helium and the hydrogen halide molecules. In a typical situation the selected inert gas or gas mixture will be present in a much larger quantity in the discharge tube than the hydrogen halide. A typical ratio of these gases present in the mixture will be in the neighborhood of 10 to 1. This ratio, however, can vary rather substantially in both directions depending on the desired results and the operating conditions, usually favoring a higher rather than a lower ratio. Some of a third gas such as hydrogen may also be present.

At least some of the atomic halide atoms produced by the aforesaid collisions are also excited to an electronic state producing a population inversion of the energy levels due to the energy that produced them and these are able to generate a relatively strong laser action on transitions at wavelengths near the wavelength of 7,000 A. The more intense lines occur at 7,037.45 A and at 7,127.88 A. Other lines which are also relatively easy to detect occur at 7,800.22 A and at 7,202.37 A. The relaxation of the lower laser levels proceeds by spontaneous emission of radiation in the ultra-violet part of the spectrum and also by collisions with the unexcited hydrogen atoms that are present.

The laser illumination produced during discharge of the capacitor 54 reflects back and forth between the optical resonator mirrors 42 and 44 in the usual way for lasers, and the laser output passes through the transparent or translucent aperture 46 associated with the mirror 44.

The construction shown in FIG. 2 is similar to the construction shown in FIG. 1 except that the FIG. 2 construction is a static gas filled construction which is sealed with the same or similar gas mixture but in a static instead of a flow through condition in discharge tube 14a. The construction shown in FIG. 2 has its various parts numbered the same as the corresponding parts of the FIG. 1 construction but with a subscript $a$ included for corresponding parts.

One advantage of the construction of FIG. 2 over that shown in FIG. 1 is that it can be made to be much more compact and therefore lends itself more readily to being made as a portable instrument. This is because there is no need for separate sources of gas, gas conduits, pumps, exhaust and other means which are needed in the FIG. 1 construction for feeding the gases through the discharge tube and maintaining the desired mixture and pressures. Hence, the static fill construction of FIG. 2 is structurally and operationally much simpler than the flow through construction but it also has some limitations and disadvantages as well, including the fact that some loss of the atomic fluorine or other similar element may occur in time due to reaction thereof with the material of which the discharge tube is formed as well as with the other elements of the structure. With either of the constructions, however, the electric discharge can be operated continuously or intermittently by closing the switch 52 or by eliminating the capacitor 54 and connecting the voltage source directly between the cathode and anode. As explained, the electrical discharge and accompanying dissociation of some of the fluorine which occurs should take place with sufficient energy to also be able to electrically excite the dissociated particles if the device is to be able to achieve the desired lasing condition.

It is contemplated to use gaseous mixtures of substances other than helium and hydrogen fluoride although this particular selection for the gaseous mixture appears to be the best or one of the best that is known. Other gaseous substances which can be used but may not in some cases be as satisfactory as helium and hydrogen fluoride include as a substitute for the helium, gases such as neon (Ne), argon (A), krypton (Kr) and xenon (Xe) and as a substitute for the hydrogen fluoride any of the hydrogen halides, including hydrogen chloride, hydrogen bromide and hydrogen iodide. Some amounts of nitrogen, oxygen and carbon dioxide may also be used in some cases. It is also possible and contemplated to combine two or more of the last named gaseous substances in a mixture and with some helium and/or hydrogen also. Test results indicate that the presence of some helium (He) improves the operation and may even be required in most cases. This can be understood in terms of the dissociative transfer of energy from the metastable gas to the hydrogen halide. Hydrogen fluoride (HF) has proven out to be a very suitable gas for the present device. Tests have also been made using sulphur fluoride ($SF_6$). The differences in results obtained between the use of hydrogen fluoride (HF) and sulphur fluoride ($SF_6$), however, is most apparent in the difference in the amount of energy required to break off or separate a fluorine atom. In the case of hydrogen fluoride (HF) the dissociative energy required is approximately 5.85 electron volts (eV) as compared to only about 3.3 eV to break off a fluorine atom from $SF_6$.

When a mixture of helium and hydrogen fluoride is used the helium must be present in substantially greater quantity than the hydrogen fluoride as indicated above by reference to a ratio of 10 to 1. This ratio applies to the selection of other suitable mixtures of the named gases. This ratio has been determined experimentally. When such a mixture is present in the discharge tube 14 (or 14a) and is subjected to an electrical discharge, the inert gas, which is initially in a monatomic condition, is excited sufficiently to go to its metastable state. In so doing, some of the particles of the metastable gas collide with the particles or molecules of the selected hydrogen halide as aforesaid and these collisions dissociate some of the halide particles from the hydrogen and excite them to produce a population inversion in the energy levels of the halide and the desired lasing condition. In simplified terms this means that the planetary electrons in the halide particles must be made to move at certain higher velocities. If the dissociated excited particles are not so excited there is little or no likelihood that a lasing condition will take place. It has been discovered that when helium is excited by an electric discharge under the conditions described, it will produce the conditions necessary to cause lasing to occur. It is believed that most of the other inert substances in the various possible combinations of the listed gases are also able to produce lasing conditions but in many of these cases the addition of some helium, and possibly also some hydrogen, may improve the results and may even be necessary to achieve lasing. Some of these gases and mixtures thereof are currently being tested.

In the static construction shown in FIG. 2 some change and possible deterioration in the operating results may occur because of the affinity of the dissociated excited fluorine or other halide particles to react with the gases that are present and with the materials used in the construction of the discharge tube 14a. This may mean periodic recharging of the discharge tube. Even so, the static construction has certain things in its favor, including the fact that it is structurally very simple and lends itself more easily to being made portable.

It has been the inventors' experience that when certain of the helium substitutes mentioned above are used, it has not always been possible to observe a lasing action. It is believed this is due at least in part, to the fact that the metastable conditions of these other gases have more than sufficient energy to dissociate the HF and some of the other hydrogen halides but they may not have enough additional energy to also excite the dissociated halide sufficiently to produce a lasing condition. Hence any particular selection of gases may require some experimentation and testing to make sure that they will produce lasing. As indicated above, there are many different gases and combinations of gases that can be used in the subject device, including the various hydrogen halides and the inert gases mentioned above and combinations thereof. A mixture of helium and hydrogen fluoride with and without some added molecular hydrogen in the relative amounts indicated, however, seem to provide the strongest easiest-to-detect outputs.

Thus, there has been shown and described a novel dissociative transfer laser construction and system which fulfills all of the objects and advantages sought therefor. It should be apparent, however, from the description of the invention that numerous modifications, changes, alterations, including the different possible combinations of gases, and other uses and applications of the subject device, are possible, and are contemplated as being within the scope of the invention. All such modifications, changes, alternations, combinations of gases and other uses and applications which do not depart from the intention and scope of the invention are deemed to be covered by the invention which is limited only by the claims which follow.

What is claimed is:

1. A dissociative transfer laser comprising means forming an elongated discharge chamber constructed of a relatively inert substance, a gaseous mixture in said chamber including a mixture of helium gas, hydrogen fluoride gas and molecular hydrogen, said helium gas being present in the mixture in quantities at least equal to about ten times as great by volume as the hydrogen fluoride gas, the pressure of said gaseous mixture being between about 0.01 and 2.0 Torr, optical resonator means capable of sustaining oscillation at the wavelengths 7037.45A, 7127.88A, 7202.37A and 7800.22A and including a pair of spaced reflectors positioned to be in optical communication with each other through the gaseous mixture, one of said reflectors being located adjacent to each opposite end of the discharge chamber, a pair of spaced electrodes mounted extending into the discharge chamber adjacent opposite ends thereof in the space between the spaced reflectors, and means including a source of voltage connected between said electrodes to produce an electric discharge through the gaseous mixture sufficient to cause at least some of the helium gas to go into a metastable condition and to produce collisions with some of the particles of the hydrogen fluoride gas that are present, said collisions being sufficient to cause dissociation of some of the hydrogen fluoride gas particles whereby some of the fluoride component is dissociated from its hydrogen component, the energy introduced to dissociate the fluoride being sufficient to also electrically excite the dissociated fluoride particles to produce a population inversion of the energy levels and an accompanying visible lasing condition.

* * * * *